United States Patent [19]
Aurora

[11] Patent Number: 5,385,506
[45] Date of Patent: Jan. 31, 1995

[54] HUB-SPIDER DRIVE ASSEMBLY FOR A HOOKE'S JOINT

[76] Inventor: Enrico Aurora, Miglianico (Chieti), Italy

[21] Appl. No.: 78,592

[22] Filed: Jun. 17, 1993

[30] Foreign Application Priority Data

Oct. 23, 1992 [IT] Italy .................. RM92U000217

[51] Int. Cl.$^6$ ............................................. F16D 3/16
[52] U.S. Cl. ............................... 464/117; 464/136; 403/53; 403/58; 403/72
[58] Field of Search ................. 403/52, 53, 58, 72; 464/136, 117, 114, 118, 147

[56] References Cited

U.S. PATENT DOCUMENTS

| | | | |
|---|---|---|---|
| 1,096,235 | 5/1914 | Fox | 464/136 |
| 2,369,810 | 2/1945 | Stillwagon, Jr. | 464/136 |
| 3,110,166 | 11/1963 | Shutt, Jr. | 464/136 |
| 3,232,076 | 2/1966 | Sundt | 464/136 |
| 3,740,969 | 6/1973 | Shotter | 464/136 |
| 4,272,972 | 6/1981 | James | 403/58 |
| 4,371,358 | 2/1983 | Laue | 403/58 |
| 4,610,559 | 9/1986 | Mayhew et al. | 403/58 |

*Primary Examiner*—John T. Kwon
*Attorney, Agent, or Firm*—Darby & Darby

[57] ABSTRACT

A hub-spider assembly for a Hooke's joint in which the arms of the spider (2) include a first shaft (4), having a through-hole (41) bored in a central boss (42), the through-hole (41) axis being perpendicular to the axis of the first shaft (4), and a second shaft (5) coupled with slight interference with the first shaft (4) in its through-hole (41). At least one end of the shaft (5) is threaded or predisposed equivalently for coupling. In a double Hooke's joint a rotating coupling is realized by a bearing pair (31, 32) housed in the branches (11, 12) of a hub (1) and support the second shaft (5), the bearings (31, 32) being held in place by end ring-nuts (61, 62) at the threaded pivot ends (51, 52) of the shaft (5).

6 Claims, 2 Drawing Sheets

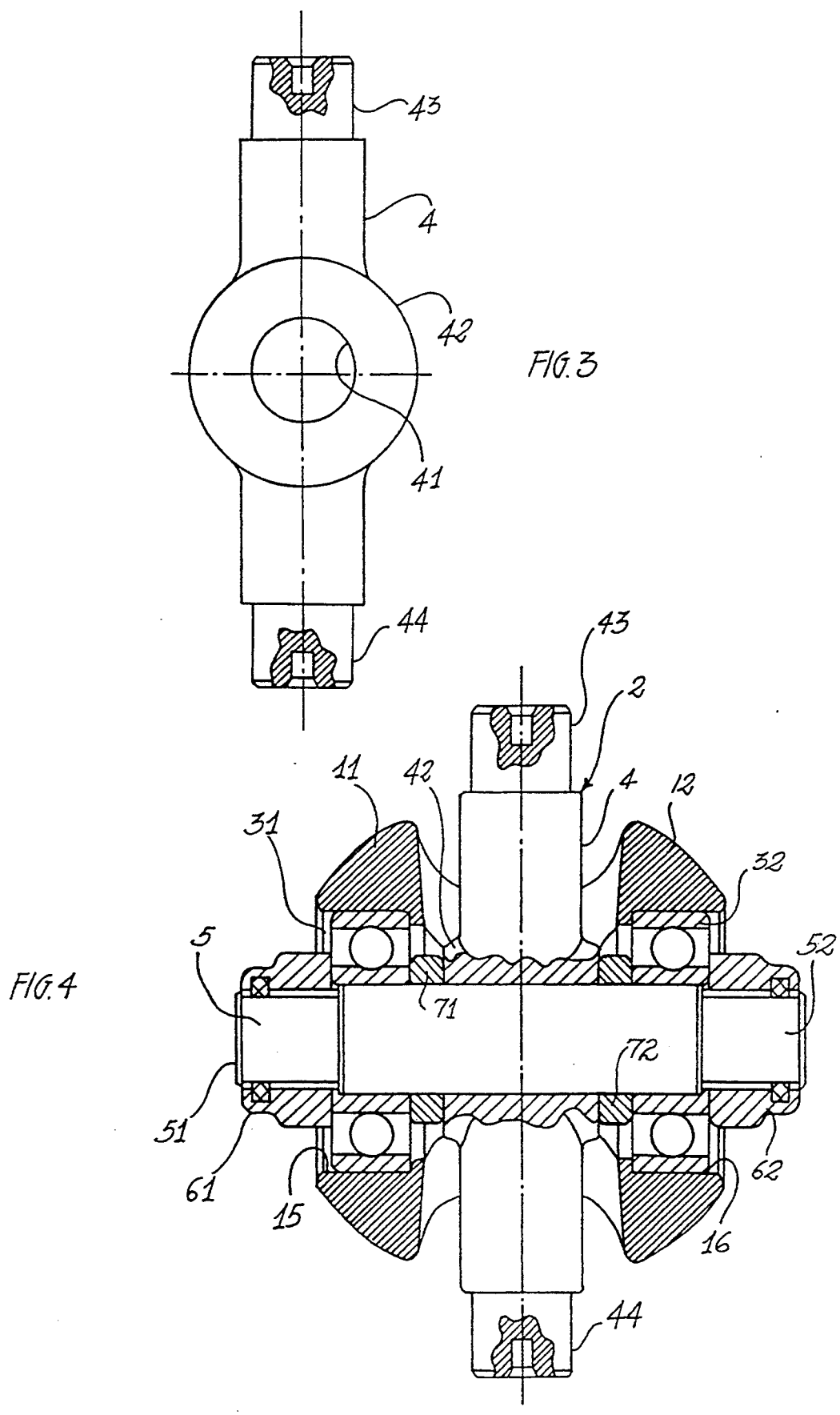

HUB-SPIDER DRIVE ASSEMBLY FOR A HOOKE'S JOINT

BACKGROUND OF THE INVENTION

The invention relates to a hub-spider drive assembly for a Hooke's joint. In a single Hooke's joint the arms of the spider are in a rotating connection coupling with meeting branches of a shaft hub and yoke which are connected by the joint. In a double Hooke's joint, the arms of the spider of each joint are generally symmetrically in a rotatingly coupled relationship with a shaft hub arms and a joint half-bearing.

Conventionally, the arms of the spider form a single piece, since they are perpendicularly joined, generally by welding.

This realisation of the joint spider in one piece gives rise to a series of drawbacks which are principally connected with work precision, given the small typical tolerances afforded by these connections.

Mounting problems are also present, originating from the connection of the four ends of the arms of the spider to branches of hub and double-jointed half-bearing by means of bushings or bearings.

The above-mentioned drawbacks and problems reflect negatively on the total quality of the joint as well as on its costs.

The aim of the present invention is thus to eliminate the above drawbacks and to provide a Hooke's joint which, with respect to conventional joints of the same type, is easier to manufacture, is more dimensionally precise, is cheaper to manufacture and is stronger.

SUMMARY OF THE INVENTION

The invention solves the problem of providing a Hooke's joint assembly of spider and hub in which the arms of the spider are in a rotating coupling relation with hub branches and shaft yoke branches in a single joint and, respectively, with hub branches of a shaft and a joint half-bearing in a double Hooke's joint, which, from a general point of view, is characterised in that the said perpendicular arms of the spider comprise a first shaft, having a through-hole bored in a central boss with an axis which is perpendicular to an axis of the said first shaft, and a second shaft coupled with slight interference to the said first shaft in the said through-hole; at least one of the said shafts having a threaded pivot end or in any case being predisposed equivalently for coupling.

In a single Hooke's joint which employs an assembly of spider and hub according to the present invention, the rotating coupling of the spider arms with the hub and yoke branches of the meeting shafts which the joint connects is realised by means of a pair of bearings housed on the hub and yoke branches and held by end ringnuts.

In a double Hooke's joint the rotating coupling of the spider arms with the shaft hub arms and a joint half-bearing is made by means of a pair of bearings housed on the hub arms and held there by end ringnuts, and respectively by means of bushings inserted in special seatings in the joint half-bearing.

BRIEF DESCRIPTION OF THE DRAWINGS

Further characteristics and advantages of the present invention will better emerge from the detailed description that follows, of an embodiment of the invention, herein illustrated purely in the form of a non-limiting example in the accompanying figures, in which:

FIG. 3 shows in a partially-sectioned vertical view a first spider shaft for a double Hooke's joint according to the invention;

FIG. 4 shows in transversal section a drive-hub-spider assembly for a double Hooke's joint according to the invention.

DESCRIPTION OF THE PREFERRED EMBODIMENTS

Figure 1:
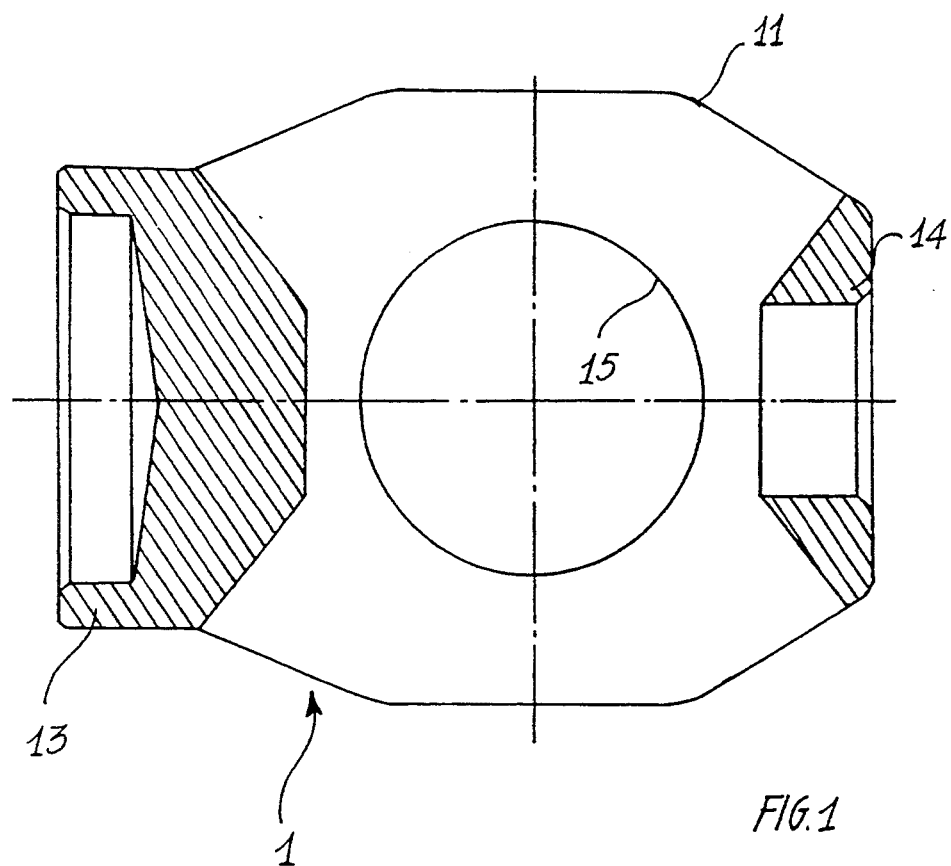
FIGS. 1 and 2 show in longitudinal section and, respectively, transversal section, a drive hub for a double Hooke's joint according to the invention.
Figure 2:
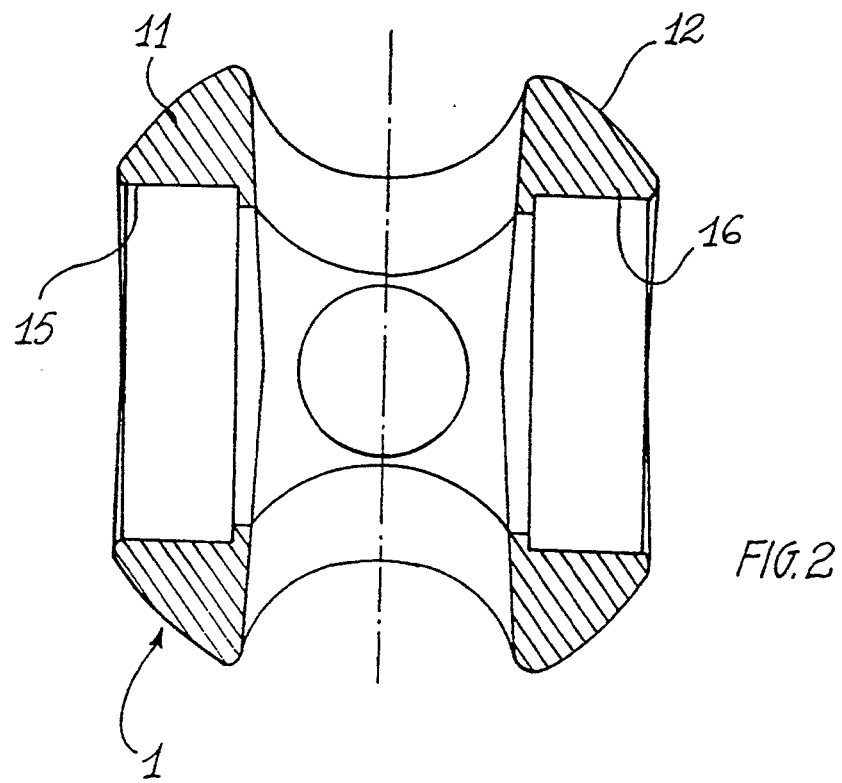

The following is a description of an embodiment of a drive hub-joint spider assembly for a double Hooke's joint, but it is obvious that the same assembly, with some modifications to which reference will be made in the following and which are however obvious to anyone skilled in the art, could be used for a single Hooke's joint. With reference to the FIGS., 1 denotes a drive-hub and 2 denotes a spider for a Hooke's joint according to the invention.

In particular, the hub 1, which has branches 11 and 12, exhibits a connection end 13 aimed at connecting conventionally with the relative shaft (not illustrated in the figures) and a housing end 14 specially conformed so as to engage, again conventionally, with the satellite (not illustrated) of the double joint.

In seatings 15 and 16 of the branches 11 and 12 of the hub 1 bearings 31 and 32 are housed, for the spider 2 of the invention, which will now be described.

As is shown in FIG. 3, the spider 2 comprises a first shaft 4 having a through-hole 41 bored in a central boss 42. The through-hole 41 has an axis which is perpendicular to the axis of the shaft 4. The retaining pivot ends 43 and 44 of the shaft 4 are aimed at engaging, in a known and therefore not further described way, in bushings (not illustrated) of the shell of a double joint. In the through-hole 41, a second shaft 5 is coupled with a slight interference, as is shown in FIG. 4.

The shaft 5, which has threaded pivot ends 51 and 52 is supported, by means of the ball-bearings 31 and 32, on the branches 11 and 12 of the drive-hub 1. The bearings 31 and 32, which may or may not be ball-bearings, are held by means of respective ring-nuts 61 and 62 screwed on the threaded pivot ends 51 and 52 of the shaft 5 against relative contact spacers 71 and 72 on the opposite side of the boss.

If the assembly according to the invention is used in a single Hooke's joint, in which the arms of the spider are in a rotating coupling with the hub arms and yoke of the shafts meeting in the joint, the rotating coupling is realised by means of a pair of bearings housed in the hub arms and yoke. Then a first and a second shaft are supported on each bearing pair, which shafts are held by means of end ring-nuts. For this reason, the pivot ends of both shafts are, in this case, threaded.

What is claimed:

1. A Hooke's joint assembly comprising:
   a hub including
      a central part with a branch arm at each end,
      a first hole through said central part and the branch arms and a second hole through said central part transverse to said first hole,
      a bearing at each of said branches aligned with said first hole,
   a spider including a first shaft having a boss with a third hole therethrough transverse to the first shaft longitudinal axis, said first shaft aligned in said hub second hole with the third hole of the boss aligned with the hub first hole, and a second shaft extending through said third hole of said first shaft boss in an interference fit coupling relationship, the ends of said second shaft mounted in said bearings.

2. A Hooke's joint as in claim 1 further comprising means at each end of said second shaft for coupling the end of said second shaft to said bearings.

3. A Hooke's joint as in claim 2 wherein said coupling means comprises a thread on each end of said second shaft and a nut fastened thereto.

4. A Hooke's joint as in claim 3 further comprising a spacer between each outer face of the first shaft boss and the inner face of the bearing at each end of the second shaft.

5. A Hooke's joint as in claim 1 wherein each said branch arm has a recess in which the bearing is located.

6. A Hooke's joint as in claim 1 wherein said hub central part is smaller in cross-section than each said branch along a line transverse to said first hole.

* * * * *